United States Patent [19]

Pavlecka

[11] 4,084,918

[45] Apr. 18, 1978

[54] WIND MOTOR ROTOR HAVING SUBSTANTIALLY CONSTANT PRESSURE AND RELATIVE VELOCITY FOR AIRFLOW THERETHROUGH

[75] Inventor: Vladimir H. Pavlecka, Newport Beach, Calif.

[73] Assignee: Turbomachines, Inc., Irvine, Calif.

[21] Appl. No.: 495,255

[22] Filed: Aug. 6, 1974

[51] Int. Cl.² ........................ F01D 1/14; F03D 3/04
[52] U.S. Cl. .................................. 415/1; 415/2; 415/52; 415/212 R; 290/55
[58] Field of Search ............ 415/1, 2, 3, 4, 54, 415/212 R, 52, 60; 416/178, 223 A; 290/55

[56] References Cited

U.S. PATENT DOCUMENTS

| 264,164 | 9/1882 | Jackson | 415/4 |
|---|---|---|---|
| 757,800 | 4/1904 | Williams | 415/2 |
| 969,587 | 9/1910 | Williams | 415/4 |
| 997,802 | 7/1911 | de Geofroy | 415/4 |
| 1,646,723 | 10/1927 | Bonetto | 415/4 |
| 2,017,961 | 10/1935 | Ferral | 415/2 |
| 2,335,817 | 11/1943 | Topalov | 415/2 |
| 2,658,700 | 11/1953 | Howell | 415/54 |
| 3,181,777 | 5/1965 | Coester | 415/54 |

FOREIGN PATENT DOCUMENTS

| 576,980 | 8/1924 | France | 415/2 |
|---|---|---|---|
| 135,215 | 1/1920 | United Kingdom | 415/52 |
| 3,253 of | 1878 | United Kingdom | 415/213 R |

*Primary Examiner*—Carlton R. Croyle
*Assistant Examiner*—Thomas I. Ross
*Attorney, Agent, or Firm*—Gordon L. Peterson

[57] ABSTRACT

A method of generating power from wind comprising providing a turbine in an airstream with the turbine having a rotor with a plurality of blades and a stator with a plurality of blades upstream of the rotor. A portion of the ambient airstream is increased in velocity and reduced in pressure by passing such portion of the ambient airstream through the stator to provide an incoming airstream. The incoming airstream is passed through the rotor to drive the rotor and to provide an exiting airstream. The exiting airstream is conducted through a duct to increase the pressure and decrease the velocity of the exiting airstream, and subsequently the exiting airstream is discharged from the duct to the atmosphere.

19 Claims, 10 Drawing Figures

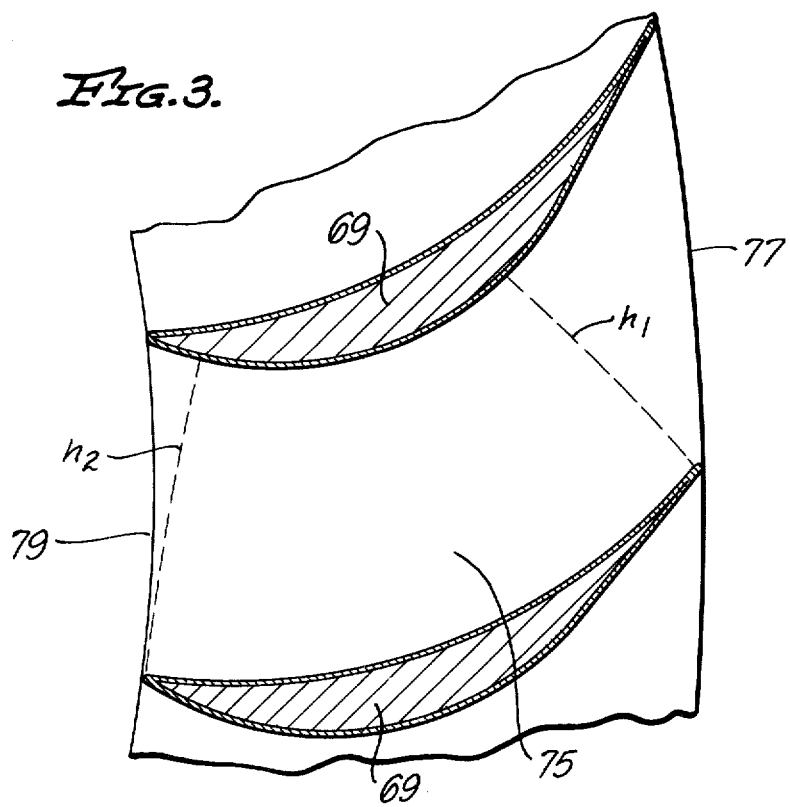
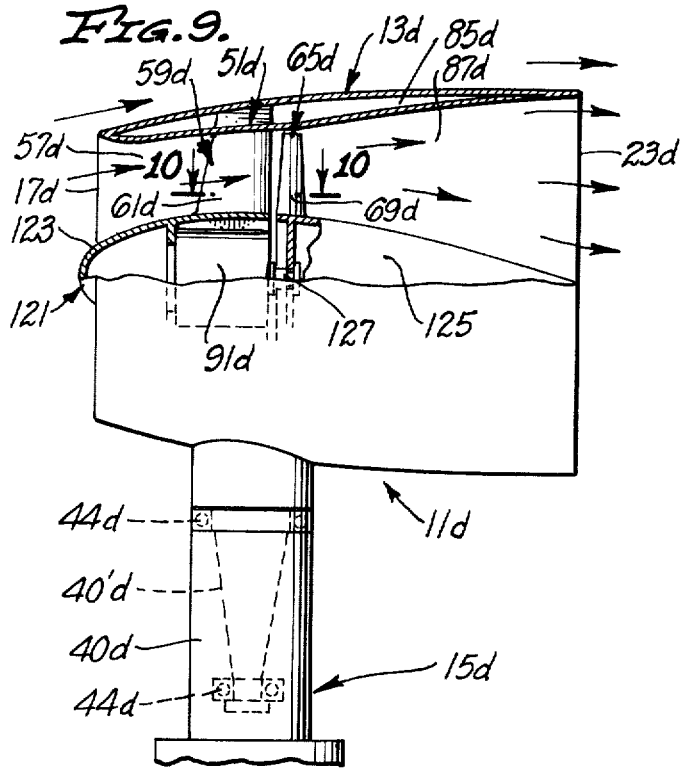
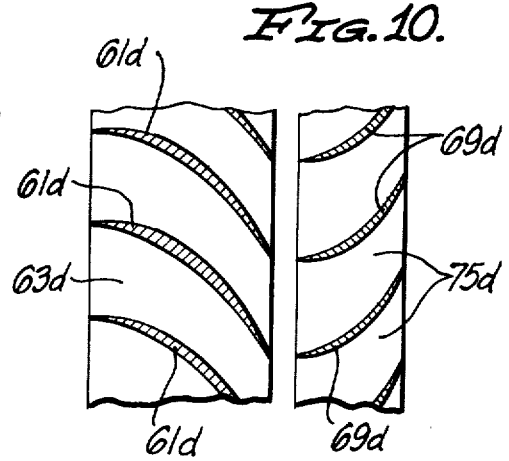

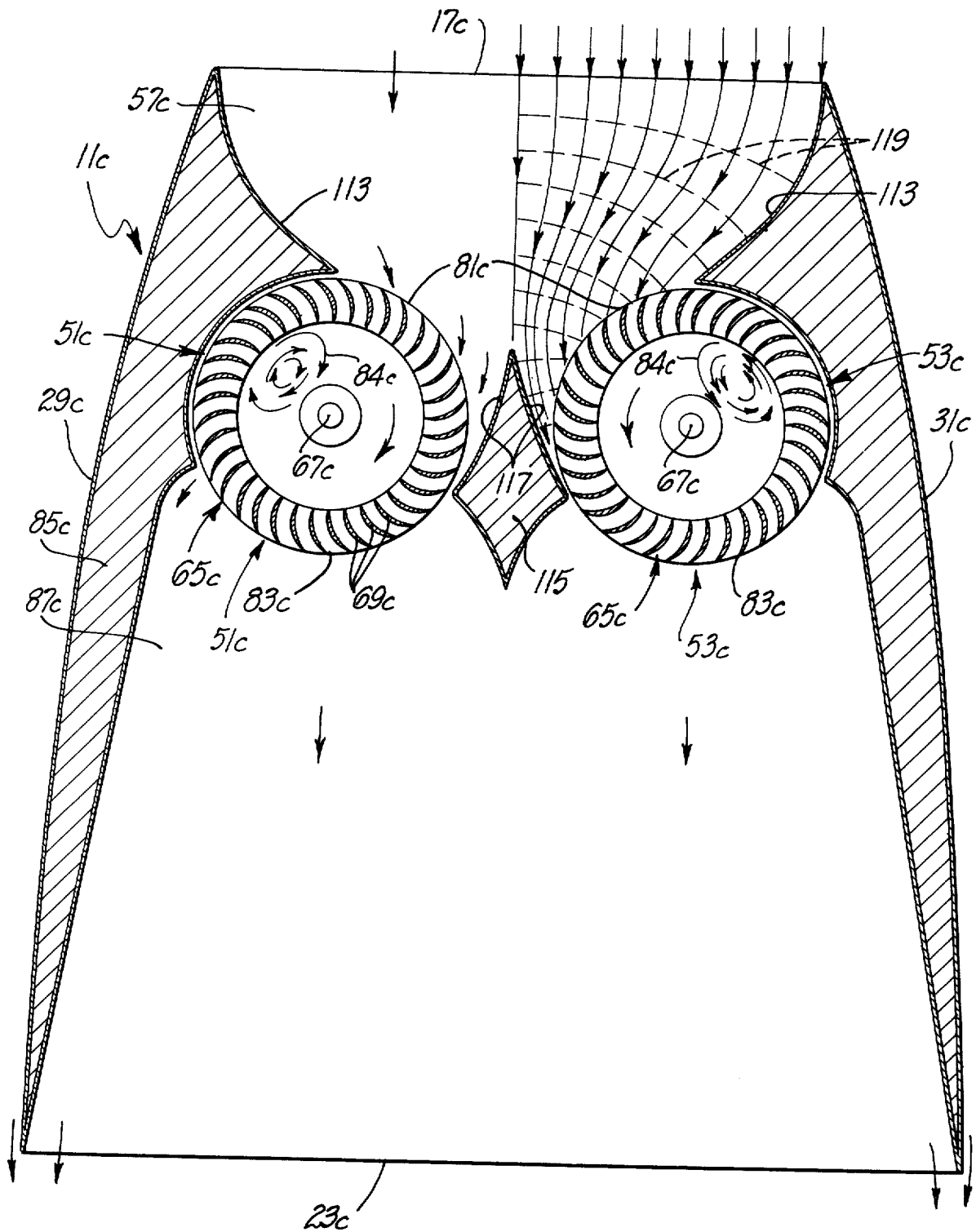

WIND MOTOR ROTOR HAVING SUBSTANTIALLY CONSTANT PRESSURE AND RELATIVE VELOCITY FOR AIRFLOW THERETHROUGH

BACKGROUND OF THE INVENTION

A wind motor is a power conversion device which derives its power from the wind. Wind motors possess the unique advantages of using a power source which is both free and inexhaustible.

Conventional wind motors utilize a propeller type rotor placed in an ambient airstream to convert the energy of the airstream into rotary mechanical power. The mechanical power thus derived can be used for various purposes including driving an electric generator.

In order to generate large amounts of power, it is necessary that a wind motor have a large area exposed to the wind. Unfortunately, propeller driven wind motors become extremely impractical at relatively large sizes. For example, in order to increase the size and exposed area of a propeller wind motor, it is necessary to increase the diameter of the propeller, and before a large enough diameter to produce substantial power is reached, the cost and expense problems associated with the large propeller and its mounting structure become limiting factors. These size and cost factors are magnified if the propeller is to be used within a diffuser.

As the diameter of the propeller is increased, the maximum speed of rotation must be reduced. However, with a propeller driven wind motor, the maximum speed of rotation must be reduced rather sharply as the diameter of the propeller is increased. In addition, a propeller produces air swirls downstream of the propeller which create energy losses.

SUMMARY OF THE INVENTION

The present invention provides a fluid operated motor such as a wind motor which can be feasibly constructed in large sizes. In addition, the maximum speed of rotation of the wind motor of this invention need not be reduced as rapidly with increasing rotor diameter. Finally, the air swirl associated with propellers is eliminated.

One feature of the invention is to increase the velocity of an ambient airstream and then use this relatively high velocity stream to drive a turbine. The velocity of the ambient airstream can be increased in different ways such as by using a stator or an appropriately configured nozzle. One advantage of a stator is that it provides a uniform approach angle and a uniform velocity of the air at the inlet to the rotor. A nozzle, on the other hand, eliminates the "ram" effect, does not require as high a velocity of the air at the inlet to the rotor, and may be less expensive. When a stator is used it has a plurality of blades upstream of the rotor. Adjacent pairs of the stator blades are arranged to define stator channels of progressively decreasing cross sectional area. Accordingly, passage of air through these channels increases its velocity above the velocity of the ambient air-stream and expands the air, i.e., reduces its pressure below ambient pressure. The stator blades also direct the high velocity, low pressure airstream toward the rotor.

The rotor includes a plurality of blades adapted for either axial or radial flow of air across the blades.

For large sizes, a rotor adapted for radial air flow should be used. With radial flow, the wind motor can be of a configuration which is relatively easy to construct in large sizes such as tall generally rectangular solids which approximate tall building geometry. Another advantage of this type of rotor is that as its size increases, its maximum velocity reduces relatively slowly so that for relatively large units, the angular velocity of the turbine rotor can exceed the angular velocity of a propeller rotor of corresponding exposed area.

Another feature of the radial flow rotor is that passage of the air through the rotor is accomplished without substantially changing the pressure and relative velocity, i.e., relative to the rotor, of the air passing through the rotor. Of course, normal losses would occur in the rotor, but except for these, the pressure and relative velocity of the incoming airstream to the rotor is substantially identical to the airstream exiting from the rotor. The absolute velocity of the air passing through the rotor drops significantly, and this velocity change is converted into energy.

This feature is of particular advantage when the air enters the rotor at an inlet, passes through a central region of the rotor, and then leaves the rotor at an outlet. If this constant pressure feature were not used in the radial flow rotor, then it would be necessary to compress the air entering or leaving the rotor, and the compression would extract energy from the rotor.

In a preferred form, the rotor blades are mounted in a ring around the axis of rotation of the rotor. Adjacent pairs of the rotor blades are spaced generally circumferentially to define rotor channels. The rotor has a cavity within the ring of rotor blades. Thus, the air passes through the rotor blades at the inlet into the cavity and from there through the rotor blades at the outlet. Another feature of the invention is that the air in the cavity forms a vortex which allows the airstream to pass through the cavity with minimum losses.

The air leaving the turbine rotor is reduced in velocity and increased in pressure by a diffuser which ultimately discharges the air to the atmosphere. With the present invention a zone of less than atmospheric pressure is created immediately downstream of the discharge opening of the diffuser. This reduces the amount of pressure restoration which must occur in the diffuser, and consequently the power which is extracted from the air by the rotor is substantially increased. The reduced pressure at the discharge opening of the diffuser makes possible the expansion of the wind in the stator. If the pressure at the discharge opening of the diffuser were not reduced below ambient pressure, the rotors would not operate satisfactorily. This reduced pressure is created, in part, by the flat plate effect of placing an obstruction in the airstream. In other words, placing a body in an airstream inherently tends to create vortices on the downwind side of the body, and this has a pressure reducing effect. In addition, outer surfaces of the wind motor can be configured to diverge as they extend rearwardly, i.e., toward the discharge opening of the diffuser. This accelerates the wind velocity outside of the diffuser and results in further pressure reduction of the air adjacent the discharge opening of the diffuser. Thus, the present invention utilizes air outside of the turbine, i.e., the airstream along the diverging surfaces of the wind motor to increase the power which can be obtained from the air.

The pressure at the discharge opening of the diffuser can be further reduced by using a converging nozzle on one or more sides of the wind motor. Because of the reduced pressure resulting from the diverging side surfaces of the wind motor, there is already some reduced pressure at the discharge opening of the diffuser. Accordingly, a converging nozzle will be operative to accelerate the airstream moving therethrough to thereby augment the pressure reduction at the discharge opening of the diffuser.

For optimum results, an intake duct should be provided. The intake duct opens into the wind stream and conducts air to the stator. One advantage of the intake duct is that it reduces intake losses. In addition, if desired, the intake duct may converge near the turbine to provide for increasing the velocity and reducing the pressure of the air within it. Although the intake duct produces these desirable results, it is not essential, particularly with large diameter rotors. The fluid-dynamic process before the air enters the rotor requires that the wind be expanded in the stator. In the intake duct, the wind is unavoidably slowed down and its pressure is increased. This is the wellknown "ram" effect. To expand the wind to the desired velocity for entry into the rotor would require a long intake duct in the form of a nozzle. Even then the expanded wind would not have the vectorial direction (except at one station along the rotor perimeter) suitable to the rotor.

Therefore, the stator not only expands the wind to a uniform approach velocity for the rotor, but it also directs the expanded wind into a uniform vectorial attitude along the length of the entry segment. In the case of a large rotor diameter, the curvature of this entry stator segment is small and the wind will find its proper way into it without a long duct or any duct. Small diameter rotors have large curvatures and the entry duct helps to direct the wind into the stator at all stations of the entry segment.

The wind motor includes a housing on which the turbine is mounted. The housing is mounted for pivotal movement about a generally vertical pivot axis. Means responsive to the direction in which the ambient airstream is moving adjusts the position of the housing about the pivot axis so that the inlet end thereof will face into the wind. By using a turbine rotor adapted for radial flow, the housing need not have a circular cross section. Rather, the housing can be constructed in a tall buildinglike vertical column with the axis of the rotor being generally vertical and transverse to the direction in which the wind is blowing. Alternatively, the housing may have a long horizontal dimension and have the appearance of a low profile building. In this event, the axis of the rotor is horizontal, but it is still transverse to the direction in which the wind is blowing.

The radial flow rotor may be long and slender. This affords a unique opportunity for employing multiple rotors within the same housing. When this is done, the axes of the rotors can be parallel and the rotors preferably contra-rotate to facilitate power removal from the rotors.

Another advantage of twin rotors over a single larger rotor for the same intake area is that the speed of rotation of the twin rotors is higher than for a single larger rotor.

One feature of the radial flow rotor is the manner in which substantially constant relative air velocity is maintained as the air flows through the rotor channels, i.e., the space between an adjacent pair of rotor blades. If these channels were of constant width, the air would expand as it enters the rotor through the rotor channels and be compressed as it leaves the rotor through the rotor channels. The compression of air would result in an energy loss. To overcome this, the rotor channels are constructed so that the cross sectional area thereof is larger at locations adjacent the inward radial periphery than adjacent the outward radial periphery.

The present invention also includes the concept of employing an axial flow turbine in lieu of a radial flow turbine. The axial flow turbine is particularly desirable in smaller sizes. The axial flow turbine has a high specific speed, and it eliminates the air swirl which is characteristically present downstream of a propeller-type rotor. With the axial flow turbine, approximately 50% of the air expansion occurs in the stator and a second 50% occurs in the rotor of the turbine.

The invention can best be understood by reference to the following description taken in connection with the accompanying illustrative drawing.

BRIEF DESCRIPTION OF THE DRAWING

FIG. 3 is an enlarged cross sectional view showing the construction of a rotor channel.

FIG. 8 is an enlarged sectional view similar to FIG. 2 of a wind motor employing a nozzle in lieu of a stator for expanding the airstream.

FIG. 9 is an elevational view partially in section of an axial flow wind motor constructed in accordance with the teachings of this invention.

FIG. 10 is an enlarged sectional view taken generally along line 10—10 of FIG. 9 and showing the vanes of the rotor and stator.

DESCRIPTION OF THE PREFERRED EMBODIMENTS

Figure 1:
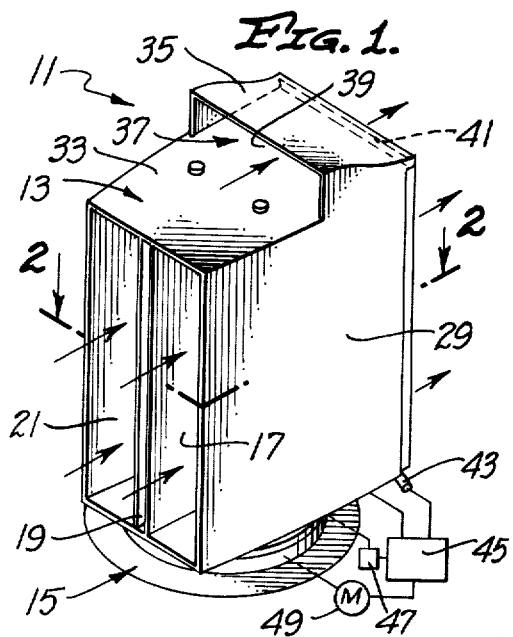
FIG. 1 is a perspective view of a wind motor constructed in accordance with the teachings of this invention.
Figure 2:
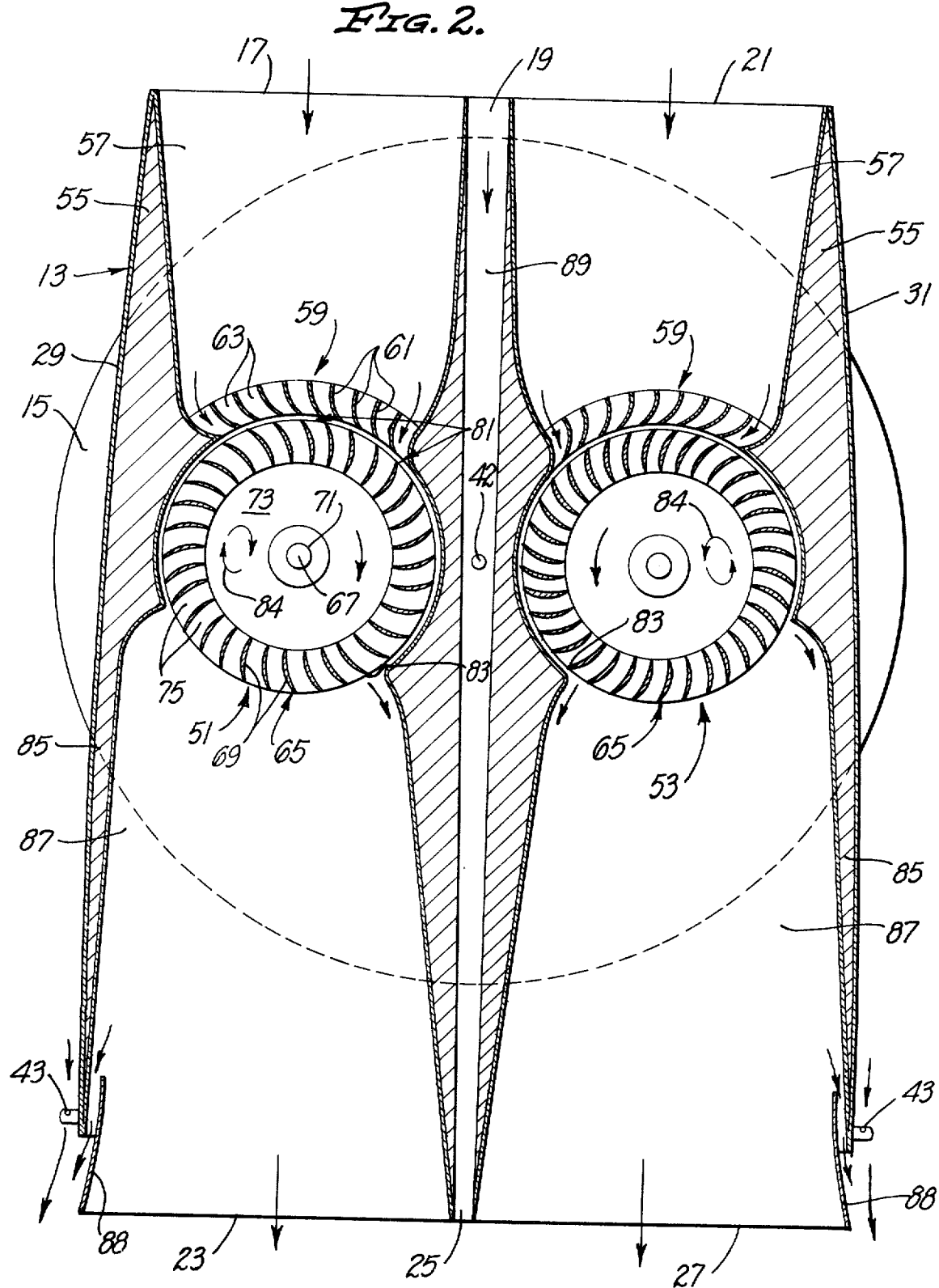
FIG. 2 is an enlarged sectional view taken generally along line 2—2 of FIG. 1.

FIG. 1 shows a wind motor 11 which includes a housing 13 mounted on a base 15. The wind motor 11 may be of any size; however, it is particularly adapted for construction in large sizes. The base 15 is suitably affixed to a supporting structure and may be, for example, affixed to a suitable foundation embedded in the earth. The housing 13 has three inlet openings 17, 19 and 21 and three outlet openings 23, 25 and 27 (FIGS. 1 and 2). Each of the openings 17, 19, 21, 23, 25 and 27 is rectangular and has its long axis extending vertically.

The housing 13 has opposite outer side surfaces 29 and 31 (FIG. 2) which diverge as they extend from the forward or inlet end of the housing 13 toward the rearward or discharge end of the housing. The housing 13 has an upper surface 33 which may be horizontal. A channel-like member 35 cooperates with the upper surface 33 to define a nozzle 37 which has a rectangular inlet 39 located substantially rearwardly of the inlets 17, 19 and 21 and a rectangular outlet 41 which is substantially coplanar with the outlets 23, 25 and 27. As shown in FIG. 1, the long axes of the inlet 39 and the outlet 41 extend horizontally, and the nozzle 37 is a converging nozzle having minimum area at the outlet 41. A nozzle similar to the nozzle 37 may also be provided on the bottom wall of the housing 13, if desired.

Except for the divergence of the side surfaces 29 and 31, the housing 13 is essentially a rectangular box. However, the divergence of the side walls 29 and 31 is not so substantial as to significantly detract from the generally rectangular appearance of the housing. It will be appreciated that the housing 13 may be constructed in very large sizes and may have the appearance of a tall building. As such, it is relatively easy to construct and has an appearance which would not be an aesthetic detraction.

Means are provided for causing the inlets 17, 19 and 21 to face into the wind. Such means may take various different forms. In the embodiment illustrated, the base 15 includes a portion 40 (FIG. 5) permanently affixed in place as to a foundation and a portion 40' affixed to the housing 13. A bearing 44 between the portions 40 and 40' enables the portion 40' to rotate about a vertical pivot axis 42 (FIG. 2) relative to the portion 40. Obviously other means for mounting the housing 13 for rotation about a generally vertical pivotal axis could be utilized.

Static pressure sensors 43 (FIGS. 1 and 3) are mounted on the side surfaces 29 and 31. The static pressures sensed by the sensors 43 on the opposite sides of the housing 13 are transmitted to a controller 45. The controller 45 in response to a differential pressure releases a brake 47 and energizes a reversible motor 49 to rotate the housing 13 in the appropriate direction until the static pressure sensed by the sensors 43 balance. At this time, the controller deenergizes the motor 49 and engages the brake 47 so that the housing 13 will be held in a position in which the inlets 17, 19 and 21 face directly into the wind. Of course, other techniques for facing the housing 13 into the wind can be utilized.

Mounted within the housing 13 are two turbines 51 and 53. The turbines 51 and 53 in the embodiment illustrated are identical except that they are arranged to rotate in opposite directions. Accordingly, only the turbine 51 is described in detail herein and corresponding reference numerals are utilized to designate corresponding parts of the turbine 53.

The housing 13 defines an identical inlet duct 55 for each of the turbines 51 and 53. Each of the inlet ducts 55 has an inlet passage 57 extending from the inlet openings 17 and 21 to the turbines 51 and 53, respectively. The primary purpose of the inlet ducts 55 is to reduce intake air losses. However, the passage 57 may converge toward the turbine 51 to obtain some increase in velocity of the air and some decrease in air pressure.

The turbine 51 includes a stator 59 including a plurality of blades 61. Adjacent pairs of the stator blades 61 are spaced circumferentially to define stator channels 63. The stator channels 63 are of reducing cross sectional area as they extend downstream. This permits the stator 59 to perform its basic function of expanding and accelerating the absolute velocity of the airstream passing therethrough. The amount that the air velocity is increased can be varied by those skilled in the art. For the sake of illustration, the ambient air velocity may be increased 1.80 times.

The turbine 51 also includes a rotor 65. The stator 59 and the rotor 65 extend axially for substantially the full height of the housing 13. Each of the stator blades 61 may extend continuously for the full height of the stator, or the stator blades 61 may be constructed of a plurality of individual sections. In either event, each of the stator blades 61 should be suitably supported against vibration and deflection.

The rotor 65 is mounted for rotation about a vertical rotational axis 67. The rotor 65 includes a plurality of blades 69 arranged in a ring about a central rotor shaft 71. The rotor 65 has a cavity 73 within the ring of blades 69.

Both the stator 59 and the rotor 65 are shown somewhat diagrammatically in FIG. 2, it being understood that the blades thereof may be mounted in accordance with known techniques. For example, the rotor blades 69 may be mounted on discs which in turn are mounted on the center rotor shaft 71. Each of the rotor blades 69 may extend for the full height of the rotor 65. Alternatively, each or some of the rotor blades 69 may be constructed of a plurality of individual sections. In either event, the blades 69 must be suitably supported against vibration and deflection.

Adjacent pairs of rotor blades 69 are spaced circumferentially to define rotor channels 75. The rotor channels 75 are sized so that there will be substantially no change in the pressure or relative velocity of the air passing therethrough. In actual practice, there will be some pressure loss of air passing through the rotor channels 75. For example, the relative velocity of the airstream leaving the rotor channels 75 at an inlet 81 to the rotor 65 may be 97.8% of the relative velocity of the air entering these channels at the inlet.

In order to maintain substantially constant relative air velocity through the rotor channels 75, it is necessary that the cross sectional area of the channel 75 increase as the channel extends radially inwardly. FIG. 3 shows an adjacent pair of the rotor blades 69 defining one of the rotor channels 75. The channel 75 shown in FIG. 3 has a port 77 opening radially outwardly and a port 79 opening radially inwardly. Reference line $h_1$ extends from the radially outermost location of one of the blades 69 to the other blade 69. Similarly, reference line $h_2$ extends from the radially innermost location of one of the blades 69 to the other blade 69. The lines $h_1$ and $h_2$ are perpendicular to all segments of the airstream passing through them. These lines are nearly straight, but are slightly bowed to the left as viewed in FIG. 3. Similar lines can be drawn at locations intermediate the lines $h_1$ and $h_2$. In order for the channels 75 to be constant velocity channels, it is necessary that $h_2$ be greater than $h_1$ and that any $h$ line radially inwardly of the line $h_1$ be greater than $h_1$.

More specifically, it can be shown that the relative velocity of air passing through the rotor channel 75 varies inversely with the distance from the rotational axis 67. Thus $W_1 = (W_2 R_2 / R_1)$ where $W_1$ is the air velocity relative to the rotor at the radial outward port 77, $W_2$ is the air velocity relative to the rotor at the radial inward port 79, and $R_1$ and $R_2$ are the radial distances from the axis 67 to the outer and inner peripheries of the centers of lines $h_1$ and $h_2$, respectively. Accordingly, if the rotor channels 75 were of constant cross sectional dimensions throughout, the change of radius would cause air expansion as the air enters the rotor through the rotor channels 75 and air compression as the air leaves the rotor cascade. To compensate for this, i.e., to have $W_1 = W_2$, it is necessary to adjust the spacing or $h$ distance between adjacent pairs of rotor blades 69 in accordance with the formula: $R_1 h_1 = R_2 h_2$.

The stator blades 61 direct the incoming airstream against the rotor blades 69 at the inlet 81 of the rotor 65. The rotor inlet 81 is relatively long circumferentially and may cover, for example, up to 140°. The air acting against the rotor blades 69 rotates the rotor 65 clockwise as viewed in FIG. 2. Some of the air remains in the rotor channels 75 as the rotor rotates; however, most of the air passes into the cavity 73 and then out through the rotor channel 75 at a rotor outlet 83. The outlet may also cover, for example, up to about 140° circumferentially. The air within the cavity 73 inherently create a vortex 84 which acts, in effect, as a ball bearing to reduce losses.

The air leaving the rotor at the outlet 83 passes into a duct or diffuser 85. The diffuser 85, like the inlet section 55 may be formed integrally with the housing 13 or may be formed separately and mounted within the housing. The diffuser 85 has a passage 87 which diverges toward the outlet 23. The diffuser includes a vertical vane 88 which reduces the thickness of the boundary layer along the adjacent side of the passage 87. An identical diffuser 85 is positioned to receive the air exiting from the rotor 65 of the turbine 53. The purpose of the diffuser 85 is to reduce the velocity and increase the static pressure of the air so that it approaches the pressure and velocity of the air immediately downstream of the outlet 23. As explained below, this pressure is less than ambient.

As shown in FIG. 2, the housing 13 has a central passage 89 which extends from the inlet 19 to the outlet 25. The passage 89 converges as it extends toward the outlet 25 to thereby increase the velocity of the air passing through it. The passage 89 may extend vertically for the full length of the rotors 51 and 53. This further tends to reduce the pressure of the air just downstream of the outlets 23 and 27. This feature is optional and has particular application to wind motors which are not very high.

Figure 4:
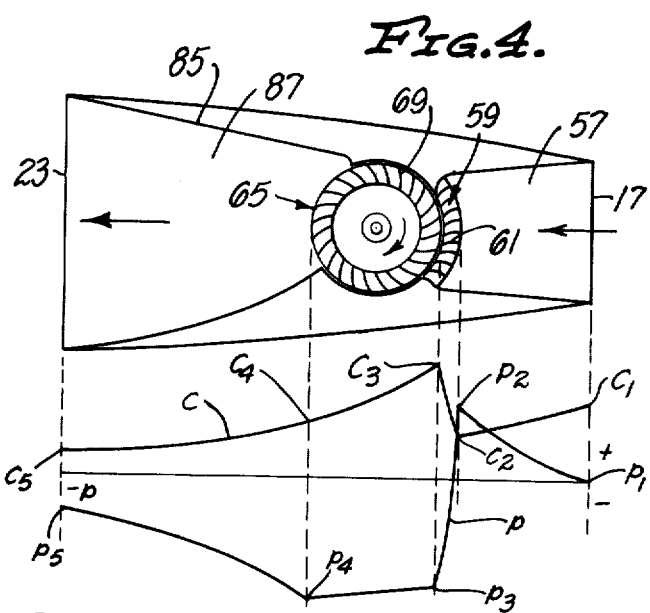
FIG. 4 is a diagrammatic view illustrating how the pressure and absolute velocity of the airstream varies as the airstream moves through the wind machine.

The operation of the wind motor 11 can best be understood with reference to FIG. 4. The ambient airstream at the pressure $p_1$ and absolute velocity $C_1$ enters the inlet 17 and progresses through the inlet passage 57 to the stator 59. During this time, the pressure of the ambient airstream is increased from $p_1$ to $p_2$ as a result of the ram effect and the absolute velocity drops to $C_2$. Thus, even though the inlet passage 57 may converge slightly toward the stator 59, the net effect is a slight pressure increase from $p_1$ to $p_2$. The airstream then passes through the stator 59 and is expanded to a much lower pressure $p_3$ and accelerated to a higher absolute velocity $C_3$ which is greater than the velocity $C_1$. The stator blades 61 direct the expanded airstream against the blades 69 of the rotor 65 to rotate the rotor. Most of the air flows radially through the rotor channels 75 and into the cavity 73 and then radially outwardly through the rotor channels 75 at the outlet 83. A small quantity of air is carried in the rotor channels 75 from the rotor inlet 81 to the rotor outlet 83.

As shown in FIG. 4, the airstream leaving the rotor 65 is at a pressure $p_4$ and an absolute velocity $C_4$. The pressure $p_4$ is substantially the same as the pressure $p_3$. However, the velocity $C_4$ is much less than the velocity $C_3$ due to the energy extracted from the airstream by the rotor 65. Thus, the amount of energy extracted from the airstream is a function of the velocity $C_1$ less the velocity $C_4$. The air then passes through the diverging passage 87 of the diffuser 85, and this increases the pressure of the air to a pressure $p_5$ and decreases absolute air velocity to $C_5$. The pressure $p_5$ is less than the ambient pressure $p_1$. The pressure $p_5$ is approximately the pressure which exists immediately downstream of the outlet 23. As explained above, the pressure $p_5$ is less than the ambient pressure $p_1$ because of the diverging side surfaces 29 and 31, the converging central passage 89, the nozzle 37, and the inherent tendency of a body placed in a wind stream to create a pressure on the downstream side which is less than atmospheric.

Figure 5:
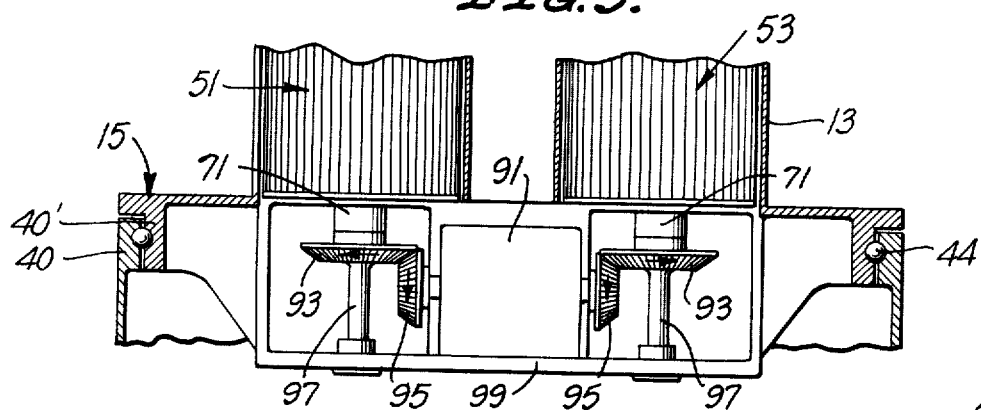
FIG. 5 is a fragmentary sectional view through the lower part of the wind motor showing the power take-off from the rotors.

The turbines 51 and 53 can be used to drive different kinds of equipment, and in the embodiment illustrated they cooperate to drive a generator 91 (FIG. 5). The central shaft 71 of the turbines 51 and 53 contra-rotate to drive pinions 93 in opposite directions. The pinions 93 in turn drive gears 95 on opposite sides of the generator 91 to thereby tend to drive the generator 91 in the same direction. The pinions 93 may be supported, if desired, by shafts 97 which in turn are supported by bearings on a mounting bracket 99.

Figure 6:
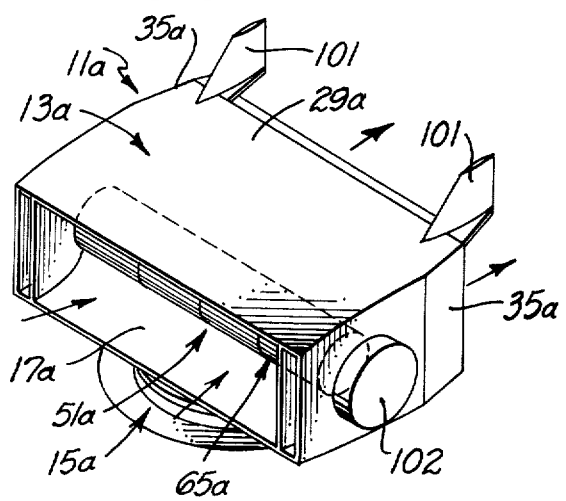
FIG. 6 is an isometric view of a second form of wind motor constructed in accordance with the teachings of this invention.

FIG. 6 shows the wind motor 11a which is identical to the wind motor 11 in all respects not specifically shown or described herein. Portions of the wind motor 11a corresponding to portions of the wind motor 11 are designated by corresponding reference numerals followed by the letter a. One difference is that the wind motor 11a is laid over on its side so that it presents a relatively low profile. The wind motor 11 may be used, for example, where wind velocities are normally relatively high such as on the top of a building or mountain. In these instances, there is no need to extend the wind motor vertically in order to get higher velocity airstreams. The wind motor 11a includes a housing 13a mounted on a base 15a for a pivotal movement about a vertical pivot axis. The wind motor 11a has only a single rotor 51a. The wind motor 11a is rotated 90° from the position occupied by the wind motor 11 so that the long axis of the inlet 17a extends horizontally as does the rotational axis of the turbine rotor 65a. With the wind motor 11a, the surface 29a is a top or upper surface, and all of the opposite external surfaces of the housing 15a diverge as they extend rearwardly. The nozzle 37 is eliminated from the wind motor 11a. A pair of fins 101 are mounted on the rearward end of the surface 29a and project upwardly. The fins 101 cause the wind motor 11a to act as a weather vane and therefore face into the oncoming wind. Elongated nozzles 35a are provided on the opposite ends of the wind motor 11a. Power can be taken off of the rotor of the turbine 51a adjacent either end of the rotor, by device 102 which may include a gear box and a generator.

Figure 7:
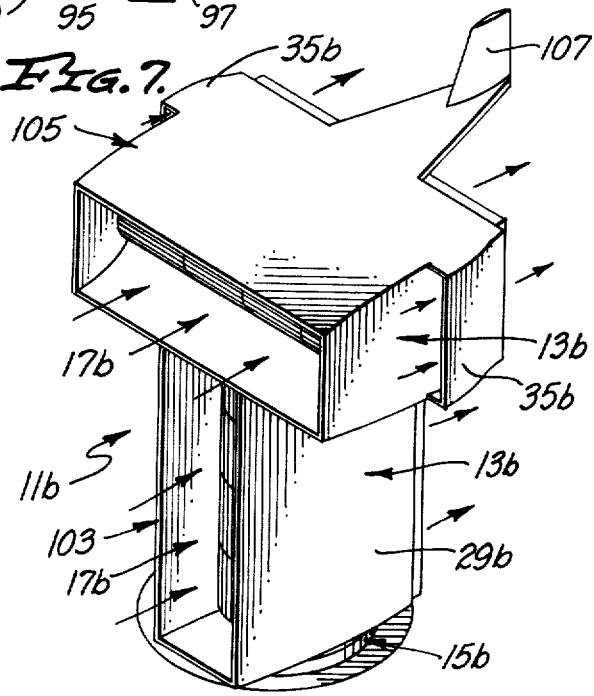
FIG. 7 is an isometric view of a third form of wind motor constructed in accordance with this invention.

FIG. 7 shows a wind motor 11b which includes wind motor sections 103 and 105 arranged to form a T. The wind motor section 103 is identical to the wind motor 11 except that only a single turbine is utilized and portions of the wind motor 11 corresponding to the wind motor section 103 are designated by corresponding reference numerals followed by the letter b.

The wind motor section 105 is substantially identical to the wind motor 11a except that only a single fin 107 is provided in lieu of the fins 101 and the nozzles 35b are shorter than the nozzles 35a. Portions of the wind motor section 105 corresponding to portions of the wind motor 11a are designated by corresponding reference numerals followed by the letter b. The axes of the sections 103 and 105 are vertical and horizontal, respectively. Each of the wind motor sections 103 and 105 may have separate power take-offs which drive separate generators. One advantage of this construction is that it places an entire wind motor section at a high elevation where ambient streams are likely to be traveling at greater velocities.

FIG. 8 shows a wind motor 11c which is substantially identical to the wind motor 11 in all respects not shown or described herein. Portions of the wind motor 11c corresponding to portions of the wind motor 11 are designated by corresponding reference numerals followed by the letter c.

The basic difference between the wind motor 11c and the wind motor 11 is that the former utilizes, in lieu of a stator, an inlet passage 57c which is in the form of a converging nozzle. The converging inlet passage 57c expands the air to a lower pressure and increases the velocity of the air. The pressure and velocity relationships at various locations within the wind motor 11c are substantially shown in FIG. 4 except that the expansion in the inlet passage 57c is not as great as in the stator but still is sufficient to convert all of the useful energy from the wind. The wind motor 11c has two turbines 51c and 53c and the single inlet passage 57c is common to both of the turbines.

The turbines 51c and 53c have identical rotors 65c. Each of the rotors 65c has an inlet 81c which is rotated inwardly relative to the corresponding rotor inlet 81 of the wind motor 11 shown in FIG. 2. Each of the rotor inlets 81c is defined at one end by an inwardly curved wall 113 of the inlet passage 57c and at the other end by a center body 115 which lies intermediate the two rotors. The center body 115 does not have a passage such as the passage 89 (FIG. 2) extending therethrough.

The center body 113 has surfaces 117 which are curved so as to attain the maximum air flow into the rotors 65c. With the surfaces 113 of the inlet passage 57c and the surfaces 117 of the center body 115, it is possible to obtain a field of flow of low energy loss and also one which has a reasonably uniform angle of approach to the rotors 65c. Potential lines 119 which are always normal to the direction of air flow, join locations at which the air velocity is equal. Air flow velocity increases as the air moves through the inlet section 57.

Each of the rotors 65c may be identical to the rotors 65. Except for the location of the rotor inlets 81c, the flow of air through the rotors 65c may be identical to the flow of air through the rotors 65. The air leaves the rotors 65c at rotor outlets 83c and from there enters a common diffuser 85c having a diverging passage 87c. The diffuser 85c functions in the same manner described hereinabove with reference to the diffuser 85. The wind motor 11c may be utilized in various different configurations such as those shown in FIGS. 1, 6 and 7.

FIGS. 9 and 10 show an axial flow wind motor 11d. Portions of the wind motor 11d corresponding to portions of the wind motor 11 are designated by corresponding reference numerals followed by the letter d.

A primary difference between the wind motor 11d and the wind motor 11 is that with the former, air flows axially rather than radially. In addition, the air expands as it moves through the stator and as it moves through the rotor. Finally, the wind motor 11d, except for its mounting structure, is generally cylindrical.

The wind motor 11d includes a housing 13d having a circular inlet opening 17d and a circular outlet opening 23d. The housing 13d is generally cylindrical but diverges as it extends toward the outlet 23d.

The wind motor 11d includes a base 15d which includes a fixed portion 40d and a movable or spindle portion 40'd which is rotatably mounted on the portion 40d by bearings 44d. This mounts the housing 13d for pivotal movement about a vertical pivot axis. The vertical pivot axis is located far enough forward relative to the housing 13d so that the wind motor 11d acts as a weather vane and forces the inlet opening 17d directly into the wind.

A streamlined center body 121 is concentric with the housing 13d and cooperates with the housing to define an annular passage extending through the housing. This passage has an inlet portion 57d which converges as it extends downstream. Although the convergence of the inlet passage 57d tends to expand the air, the ram effect increases the pressure and reduces the velocity of the air passing therethrough in much the same manner as shown in FIG. 4.

A turbine 51d which includes a stator 59d and a rotor 65d is mounted within the housing 13d. The stator 59d is suitably mounted on the housing 13d and serves to mount the center body 121 on the housing 13d. The stator 59d includes a plurality of stator blades 61d (FIG. 10) which are spaced apart circumferentially to define a plurality of stator channels 63d. The stator channels 63d are sized to expand and increase the velocity of the airstream passing therethrough.

The rotor 65d includes a plurality of rotor blades 69d which are spaced apart circumferentially to define rotor channels 75d. The stator blades 61d are appropriately curved to direct the air passing through the stator channels 63d against the rotor blades 69d at the desired angle to impart rotation to the rotor. The channels 75d differ from the channels 75 in that the former are not constant relative velocity channels. Rather, the rotor channels 75d are of progressively decreasing cross sectional area as they extend downstream so that the air passing therethrough is further expanded and the velocity relative to the rotor 65d increases. However, absolute air velocity is decreased as the air passes through the rotor 65d due to the energy extracted from the air by the rotor.

The center body 121 includes a fixed section 123 which is fixedly attached to the housing 13d by the stator 59d and a rotatable aft section 135 which is rotatably attached to the fixed section 123 by a rotatable shaft 127. The rotor 65d is mounted on and drives the rotatable shaft 127. The rotatable shaft 127 drives a suitable power conversion device such as a generator 91d.

The wind motor 11d has a diffuser 85d which includes portions of the housing 13d and a portion of the center body 121. The diffuser 85d has a passage 87d, the cross sectional area of which increases as the passage 87d extends downstream. The passage 87d terminates in the outlet opening 23d. The diffuser 85d performs the same functions indicated above with reference to the wind motor 11. The result is that the air entering the ambient airstream from the outlet opening 23d has a pressure a little less than atmospheric and a velocity which is a little less than the ambient airstream velocity. In summary, the wind motor 11d is characterized by a single turbine, axial air flow, expansion across the stator 59d and the rotor 65d, and the generally cylindrical housing 13d.

Although exemplary embodiments of the invention have been shown and described, many changes, modifications and substitutions may be made by those with ordinary skill in the art without necessarily departing from the spirit and scope of this invention.

I claim:

1. A method of generating power from wind comprising:
- providing a turbine in an ambient airstream with the turbine having a rotor with a plurality of blades and a stator with a plurality of blades upstream of the rotor;
- expanding a portion of the ambient airstream by passing some of the ambient airstream through the stator to provide an incoming airstream of less pressure and greater absolute velocity than the ambient airstream;
- passing the incoming airstream through the rotor to drive the rotor and to provide an exiting airstream;
- conducting the exiting airstream through a duct to increase the pressure and decrease the absolute velocity of the exiting airstream;
- discharging the exiting airstream from the duct; and
- said step of passing being carried out without substantially changing the pressure and relative velocity of the airstream in the rotor.

2. A method as defined in claim 1 wherein said step of passing includes passing the incoming airstream generally radially through the rotor.

3. A method as defined in claim 1 including reducing the pressure of the ambient air adjacent the region of the duct where the exiting airstream is discharged.

4. A method as defined in claim 1 wherein said step of passing includes passing the incoming airstream generally radially through the rotor, the axis of rotation of the rotor being generally transverse to the ambient airstream.

5. A method of generating power from wind comprising:
- providing a turbine having a rotor with a plurality of blades in an ambient airstream;
- expanding the airstream in a region upstream of the rotor to provide an incoming airstream of less pressure and greater absolute velocity than the ambient airstream;
- passing the incoming airstream through the rotor in a generally radial direction and without substantially changing the pressure and relative velocity of the airstream to drive the rotor and to provide an exiting airstream in a second region downstream of the rotor; and
- increasing the pressure and decreasing the absolute velocity of the exiting airstream in said second region.

6. A method as defined in claim 5 wherein the axis of rotation of the rotor is generally transverse to the ambient airstream.

7. A method as defined in claim 5 including creating a vortex in the rotor radially inwardly of the blades to assist the flow of air through the rotor.

8. A method as defined in claim 5 wherein said step of expanding includes expanding the airstream through a converging nozzle.

9. A method as defined in claim 5 wherein said rotor has a plurality of blades arranged in a ring about a cavity and said step of passing includes passing the airstream generally radially through one portion of said ring of blades to substantially completely fill the cavity and passing the airstream from the cavity generally radially through another portion of said ring of blades to provide said exiting airstream.

10. A fluid motor comprising:
- a turbine adapted to be positioned in a fluid stream, said turbine including a rotor having a rotational axis;
- said rotor including a plurality of blades and means for mounting said blades in a ring around the rotational axis of the rotor, adjacent pairs of said blades being spaced circumferentially to define rotor channels, said rotor having a cavity within said ring;
- said turbine having an inlet to said rotor and an outlet to said rotor, said inlet and said outlet being at the periphery of the rotor;
- means for increasing the velocity of the fluid stream upstream of the rotor to provide an incoming fluid stream and for directing the incoming fluid stream against the blades and into said rotor channels at the rotor inlet to drive the rotor;
- said blades being arranged to direct at least some of the incoming fluid stream at said inlet into said cavity;
- said rotor channels being sized so that the passage of fluid therethrough is substantially at constant relative velocity whereby the fluid can pass through said rotor channels at said inlet into said cavity and from said cavity through said rotor channels at said outlet without substantially altering the relative velocity of the fluid passing through the rotor channels; and
- a duct having a passage with a discharge opening, said passage being arranged to receive the fluid stream exiting from the rotor outlet.

11. A fluid motor as defined in claim 10 wherein said duct extends upstream of the inlet of the rotor to define an inlet section.

12. A fluid motor as defined in claim 10 wherein said increasing means includes a stator having a plurality of blades with adjacent pairs of the blades being spaced apart to define stator channels which increase the velocity of the fluid passing therethrough, said stator being out of the fluid stream exiting from the rotor outlet.

13. A fluid motor as defined in claim 10 wherein the effective area of each of said rotor channels on the outer periphery of said ring perpendicular to the incoming fluid stream is less than the effective area of such rotor channel on the inner periphery of said ring perpendicular to the fluid stream leaving such rotor channel.

14. A fluid motor as defined in claim 10 wherein said duct extends upstream of the inlet of the rotor to define an inlet section, said inlet section having an inlet opening, said inlet opening and said discharge opening being generally rectangular.

15. A fluid motor as defined in claim 10 wherein the fluid motor has an inlet opening for receiving the fluid stream, means for mounting the fluid motor for movement about a generally vertical axis, and means responsive to the direction in which the fluid stream is moving for moving the fluid motor about said vertical axis so that the inlet faces directly into the fluid stream.

16. A fluid motor as defined in claim 10 wherein said passage diverges as it extends away from said outlet and toward said discharge opening.

17. A fluid motor comprising:
- a turbine adapted to be positioned in a fluid stream, said turbine including a rotor having a rotational axis;
- said rotor including a plurality of blades and means for mounting said blades in a ring around the rotational axis of the rotor, adjacent pairs of said blades being spaced circumferentially to define rotor channels, said rotor having a cavity within said ring;

said turbine having an inlet to said rotor and an outlet to said rotor, said inlet and said outlet being at the outer periphery of said rotor;

means for increasing the velocity of the fluid stream upstream of the rotor to provide an incoming fluid stream and for directing the incoming fluid stream against the blades and into said rotor channels at the rotor inlet to drive the rotor;

said blades being arranged to direct at least some of the incoming fluid stream at said inlet to said cavity;

the effective cross sectional area of each of said rotor channels increasing as the rotor channel extends radially inwardly to make said rotor channels substantially constant relative velocity rotor channels; and a duct having a passage with a discharge opening, said passage being arranged to receive the fluid stream exiting from the rotor outlet.

18. A fluid motor as defined in claim 17 wherein said ring is arranged around a cavity and said fluid motor includes means for creating a vortex in said cavity from some of the fluid stream.

19. A wind motor comprising:

a housing adapted to be in an ambient airstream;

means for mounting said housing for pivotal movement about a generally vertical pivotal axis;

a turbine mounted on said housing;

said turbine including a rotor with a plurality of blades and a stator with a plurality of blades upstream of the rotor;

adjacent pairs of said stator blades being spaced apart to define stator channels which are adapted to receive the ambient airstream, said stator channels being sized to increase the velocity and reduce the pressure of the ambient airstream to thereby provide an incoming airstream, said stator blades being adapted to direct the incoming airstream against the rotor blades to rotate the rotor, with the air leaving the rotor at a rotor outlet, said stator being out of the airstream exiting from the rotor outlet;

a duct having a passage with a discharge opening, said passage communicating with the rotor at the outlet thereof, said passage diverging as it extends away from the outlet and toward the discharge opening;

means responsive to the direction in which the ambient airstream is moving to adjust the angular position of the housing about said pivotal axis;

means for reducing the pressure of the ambient air adjacent a region of the duct where the exiting airstream is discharged; and said turbine being a first turbine, said wind motor including a second turbine mounted on said housing, said second turbine having a rotor, the rotational axes of said rotors being generally parallel, means defining a passage extending through said housing intermediate said rotors, said passage having an inlet open to the ambient airstream and an outlet adjacent the discharge opening of the duct, the inlet of said passage being of greater cross sectional area than the outlet of said passage.

* * * * *